United States Patent
Chen et al.

(10) Patent No.: US 10,191,771 B2
(45) Date of Patent: Jan. 29, 2019

(54) SYSTEM AND METHOD FOR RESOURCE MANAGEMENT

(71) Applicant: HUAWEI TECHNOLOGIES CO., LTD., Shenzhen (CN)

(72) Inventors: Chong Chen, Richmond Hill (CA); Lei Guo, Markham (CA); Jason T. S. Lam, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 95 days.

(21) Appl. No.: 14/858,598

(22) Filed: Sep. 18, 2015

(65) Prior Publication Data
US 2017/0083367 A1    Mar. 23, 2017

(51) Int. Cl.
G06F 9/46 (2006.01)
G06F 9/50 (2006.01)
G06F 9/48 (2006.01)

(52) U.S. Cl.
CPC .......... *G06F 9/50* (2013.01); *G06F 9/485* (2013.01); *G06F 9/5016* (2013.01); *G06F 9/5022* (2013.01); *G06F 2209/504* (2013.01); *Y02D 10/22* (2018.01)

(58) Field of Classification Search
CPC .......................................................... G06F 9/52
USPC ........................................................... 718/104
See application file for complete search history.

(56) References Cited

U.S. PATENT DOCUMENTS

| | | | |
|---|---|---|---|
| 9,374,787 B2* | 6/2016 | de Lind van Wijngaarden | H04W 52/0258 |
| 2002/0002578 A1* | 1/2002 | Yamashita | G06F 9/4862 718/105 |
| 2005/0235288 A1* | 10/2005 | Yamakabe | G06F 9/5072 718/100 |
| 2007/0106636 A1* | 5/2007 | Sridharan | G06F 11/004 |
| 2007/0174839 A1* | 7/2007 | Takahashi | G06F 9/485 718/100 |
| 2009/0119673 A1 | 5/2009 | Bubba | |
| 2009/0234941 A1* | 9/2009 | Ammerlaan | G06F 9/505 709/224 |
| 2009/0320029 A1* | 12/2009 | Kottomtharayil | G06F 9/505 718/102 |
| 2010/0119277 A1* | 5/2010 | Nakamichi | G03G 15/50 399/407 |
| 2010/0153542 A1* | 6/2010 | Arimilli | G06F 9/5088 709/224 |
| 2012/0131367 A1* | 5/2012 | Kamijima | H02J 7/0021 713/323 |
| 2012/0166624 A1* | 6/2012 | Suit | G06F 9/5077 709/224 |

(Continued)

FOREIGN PATENT DOCUMENTS

CN    102096602 A    6/2011
CN    103530185 A    1/2014

*Primary Examiner* — Mehran Kamran
(74) *Attorney, Agent, or Firm* — Norton Rose Fulbright Canada LLP

(57) ABSTRACT

Methods and systems of managing a resource in a distributed resource management system can include: monitoring, by at least one processor, utilization of the resource being used by at least one workload; and performing an enforcement action on a particular workload of the at least one workload when a utilization condition is met, and when the particular workload has a current resource utilization exceeding its associated resource allocation limit.

20 Claims, 8 Drawing Sheets

(56) References Cited

U.S. PATENT DOCUMENTS

| | | | |
|---|---|---|---|
| 2012/0174106 A1* | 7/2012 | Seo | G06F 9/485 718/100 |
| 2012/0235823 A1* | 9/2012 | Trock | G01R 31/3679 340/636.1 |
| 2013/0060946 A1* | 3/2013 | Kenneth | G06F 12/0866 709/226 |
| 2013/0061167 A1* | 3/2013 | Rhodes | G06F 11/349 715/781 |
| 2014/0208328 A1* | 7/2014 | Chen | G06F 9/5022 718/103 |
| 2014/0282046 A1* | 9/2014 | Gonsalves | G06F 11/0709 715/740 |
| 2014/0325307 A1* | 10/2014 | Resch | G06F 11/1076 714/763 |
| 2015/0161157 A1* | 6/2015 | Ishizaki | G06F 17/30153 707/693 |
| 2015/0195303 A1* | 7/2015 | Holden | H04L 63/1458 709/229 |
| 2015/0220363 A1* | 8/2015 | Cypher | G06F 9/50 718/104 |
| 2015/0254108 A1* | 9/2015 | Kurtzman | G06F 9/5016 718/104 |
| 2015/0347181 A1* | 12/2015 | Myrick | G06F 9/44594 718/102 |
| 2015/0363237 A1* | 12/2015 | Finnie | G06F 9/5016 718/104 |
| 2016/0055025 A1* | 2/2016 | Jul | G06F 9/45558 718/1 |
| 2016/0103717 A1* | 4/2016 | Dettori | G06F 9/45558 719/318 |
| 2016/0165087 A1* | 6/2016 | Okuda | H04N 1/00307 358/1.13 |
| 2016/0226250 A1* | 8/2016 | Fukubayashi | H02J 3/32 |
| 2016/0226713 A1* | 8/2016 | Dellinger | H04L 41/12 |
| 2016/0283366 A1* | 9/2016 | Nguyen Tien | G06F 12/0246 |

* cited by examiner

SYSTEM AND METHOD FOR RESOURCE MANAGEMENT

FIELD

This disclosure relates to workload management systems, and more particularly, to systems, devices, methods and computer-readable media for resource management.

BACKGROUND

In computing environments such as cloud computing, servers, or other systems or devices, workload management systems can be used for result management, workload management and scheduling. Workloads running on the computing environment may consume or compete for resources in the computing environment. Resource usage can be managed to avoid overutilization of a resource which may crash or cause instability to a system.

SUMMARY

In accordance with on aspect, there is provided a method of managing a resource in a distributed resource management system. The method includes: monitoring, by at least one processor, utilization of the resource being used by at least one workload; and performing an enforcement action on a particular workload of the at least one workload when a utilization condition is met, and when the particular workload has a current resource utilization exceeding its associated resource allocation limit.

In accordance with another aspect, there is provided a system including at least one processor for managing a resource. The at least one processor is configured for: monitoring utilization of the resource being used by at least one workload; and performing an enforcement action on a particular workload of the at least one workload when a utilization condition is met, and when the particular workload has a current resource utilization exceeding its associated resource allocation limit.

In accordance with another aspect, there is provided a non-transitory, computer-readable medium or media having stored thereon computer-readable instructions. When executed by at least one processor, the computer-readable instructions cause the at least one processor to: monitor, by at least one processor, utilization of the resource being used by at least one workload; and perform an enforcement action on a particular workload of the at least one workload when a utilization condition is met, and when the particular workload has a current resource utilization exceeding its associated resource allocation limit.

Many further features and combinations thereof concerning the present improvements will appear to those skilled in the art following a reading of the instant disclosure.

These drawings depict aspects of example embodiments for illustrative purposes, and variations, alternative configurations, alternative components and modifications may be made to these example embodiments.

DETAILED DESCRIPTION

Figure 1:
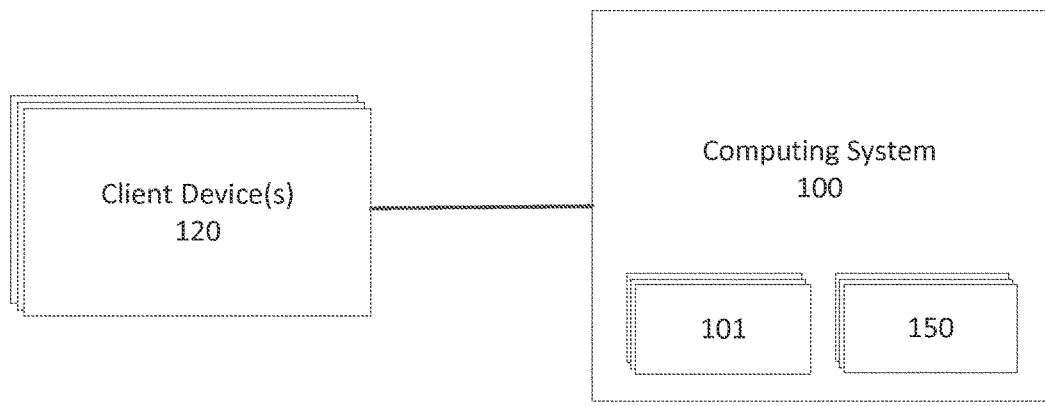
FIG. 1 is a diagram showing aspects of an example computing environment.

FIG. 1 illustrates aspects of an example computing environment 10 to which aspects of the present disclosure can be applied. In the computing environment 10, one or more client device(s) 120 can connect to a computing system 100 to access or otherwise utilize one or more resources in the computing system 100.

In some embodiments, the computing system 100 can include any combination of hardware and software components. For example, a computing system 100 may include a combination of computing devices, processors, networks, memories, storage devices, license servers, swap space, and the like. In some embodiments, the computing system 100 may be a heterogeneous or a homogenous environment, and may have different or similar hardware components running different or similar operating systems.

In some embodiments, the computing system 100 may be a single device physically or logically such as a single computing device or a single server having one or more resources.

The computing system 100 can include one or more resources 150 which can be shared between or otherwise utilized by multiple workloads. Some resources 150 may be physically or logically associated with a single device, while other resources 150 may be shared resources which may be utilized by multiple devices in the system 100.

Irrespective of the number of devices, resources, hardware or software in the system 100, in some embodiments, the system 100 may be configured to appear as a single image or interface to the client device(s) 120. The system 100 can be configured to run workloads from the client device(s) 120 and from components of the system itself.

The computing system 100 may include one or more processors 101 in a single device or split across any number of devices in the system. These processor(s) 101 can be configured to manage the resource(s) 150 in the system 100.

The computing system 100 can be configured as a distributed resource management (DRM) system. In some embodiments, the DRM system is an infrastructure middleware which can run on top of a distributed environment. The distributed environment can include different kinds of hardware and software.

The DRM system may be implemented by one or more processors in one or more devices in the system 100. The DRM system can, in some embodiments, provide a single system image to client devices, handle resource management, workload management and scheduling. Workloads can be any process, job, service, or any other computing task to be run on the system. For example, workloads may include batch jobs (e.g. high performance computing (HPC) batch jobs), Message Passing Interface (MPI), serial batch, real time analytics, elastic applications (MapReduce), long running services, virtual machines, containers, etc.

Aspects of the present disclosure may be applied to various DRM systems such as the IBM™ Platform Load Sharing Facility (LSF), Apache™ Hadoop YARN (Yet Another Resource Negotiator) and PBS (Portable Batch Scheduler), Huawei™ FusionSphere, FusionCube and FusionInsight.

Figure 2:
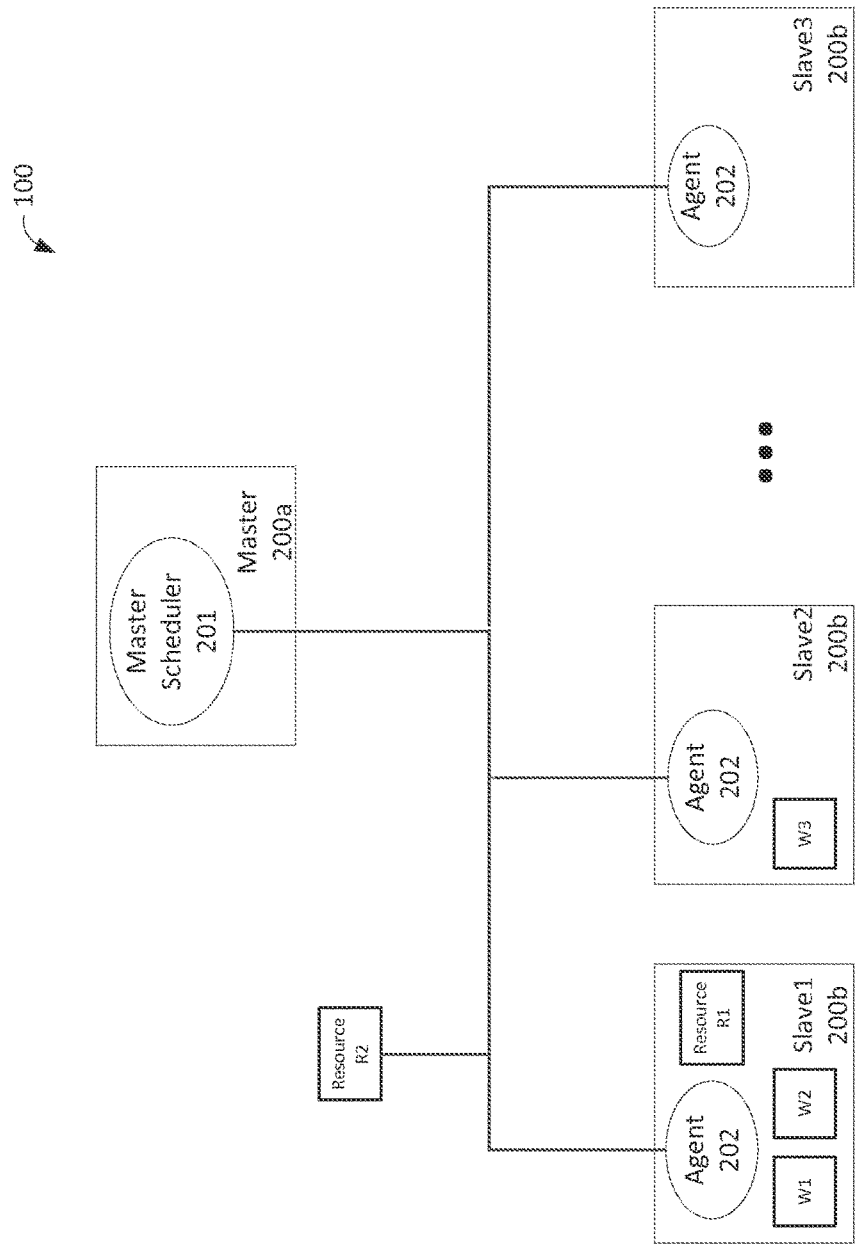
FIG. 2 is a diagram showing aspects of an example system.

FIG. 2 illustrates aspects of an example computing system 100 having multiple computing devices 200 (e.g. servers, computers, and the like). The devices 200 may be connected over any suitable connection including over communication network(s). In some examples, the devices may be part of a single unified system, or may be distributed such as in a cloud computing environment.

In some embodiments, the devices 200 may be physically or logically configured as master and slave devices. In other embodiments, other hierarchies or logical arrangements may be used. Any suitable physical and/or logical arrangement of DRM component(s) can be used.

The example system 100 in FIG. 2 has a master machine 200a and multiple slave machines 200b. Processor(s) on the master machine 200a can be configured to run a master daemon and scheduler. The daemon and scheduler can be responsible for client interaction (e.g. workload submissions, queries, control), workload scheduling and communicating with DRM agents.

Processor(s) on each slave machine 200b can be configured to operate at least one DRM agent. Processor(s) on the slave machines 200b can be configured, via a DRM agent or otherwise, to monitor and report resource availability to a master daemon. DRM agents can be configured to accept requests from the master daemon to execute and control workloads, and/or to monitor the life cycle of its workloads.

While aspects of the present disclosure refer to DRM agents, daemons, masters, slaves, etc., it should be understood that DRM components and their functions, interactions, etc. may be performed by one or more processor(s) 101 anywhere in the system 100 in any arrangement, structure, or division of responsibilities.

To increase resource 150 utilization, the system 100 can be configured for the concurrent operation of workloads on the same machine. These workloads may compete for resources. Resource usage can be managed to avoid over-utilization of a resource which may crash or cause instability to a system.

In some embodiments, a DRM system 100 can include multiple and different types of non-elastic consumable resources. These resources may be machine-based or shared. For example, a machine-based resource (e.g. R1) may, in some embodiments, only by consumed by a workload executing on that particular machine. Memory is an example of a possible machine-based resource.

A DRM system 100 can also include shared resource(s) which may also be tied to a particular device associated with an agent or may be a separate device. Shared resource(s) may be consumed by workloads running on multiple devices.

In some embodiments, a DRM agent on a machine may be responsible for enforcement for any machine-based resource(s) on that machine. The DRM agent can be configured to monitor workload resource usage for the machine-based resource(s) and take action on the workloads when necessary. For example, in FIG. 2, workloads W1 and W2 running on the slave1 device may be utilizing machine-resource R1. The agent 202 on slave1 can be configured to monitor the usage of resource R1 by workloads W1 and W2 and, if necessary, take action on these workloads for over-utilization, etc.

For shared resources, one of the DRM agents or the DRM master may be responsible for enforcement. The DRM agent or master associated with the shared resource may be configured to monitor availability of the shared resource, and to obtain usage reports from the other agents. For example, in FIG. 2, workloads W2 and W3 running on slave1 and slave2 respectively may be utilizing shared resource R2. The DRM master 201 may be configured to monitor the availability of the shared resource and to obtain usage information from the agents on slave1 and slave2 regarding the usage of resource R2 by workloads W2 and W3. If necessary, the DRM master can be configured to instruct the agent on slave1 or slave2 to take action on W2 or W3.

Other arrangements and resource/workload management/enforcement flows may also be used. These flows may be applied to any of the methods, processes or systems described herein.

Figure 3:
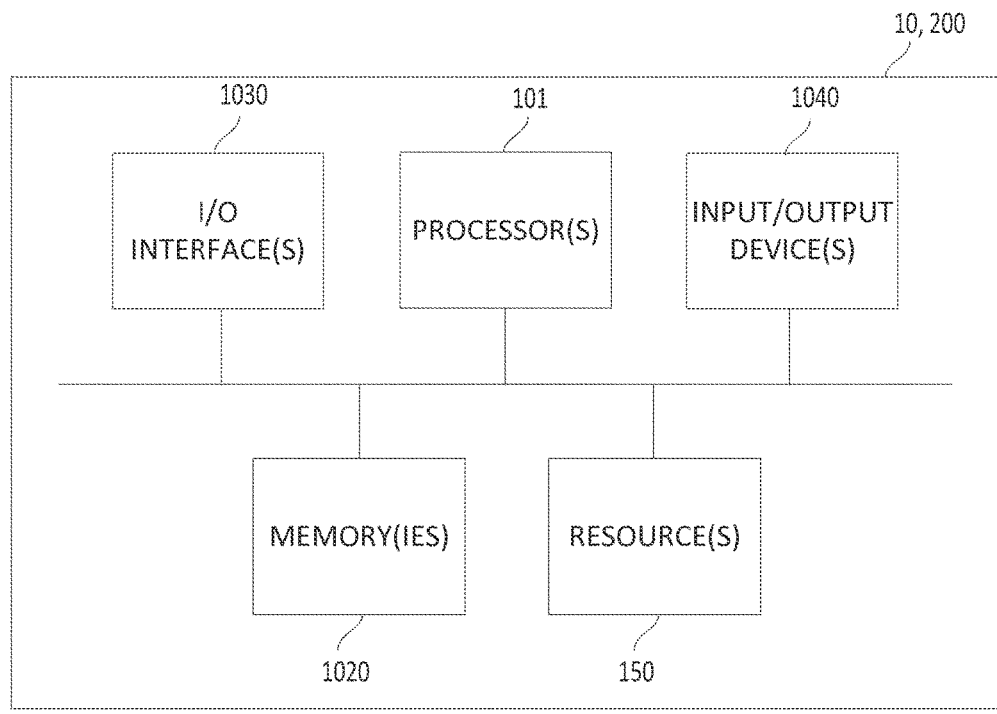
FIG. 3 is a diagram showing aspects of an example system or device.

FIG. 3 shows a schematic diagram of an example system 10 or example device(s) 200 for managing resources.

In some embodiments, the system(s) 10 or device(s) 200 may include one or more processor(s) 101, memory device(s) 1020, input/output interface(s) 1030, input device(s) 1040, resource(s) 150 and/or any other devices or mechanisms suitable for or involved in performing aspects of the methods and functions described herein.

In some embodiments, the system 10 may include one or more device(s) 200 or system(s) which provide the mechanisms, controls, devices and/or communication link(s) to perform aspects of the methods and functions described herein. For example, the system 10 may include one or more computers, servers and control devices configured for running workloads or for accessing, controlling, monitoring or otherwise utilizing resources 150. In some embodiments, an example device 200 or system 10 may be a standalone computer, server, mobile device, mainframe, supercomputer, computing array or other computing device or devices configured for executing workloads and/or managing resources.

In some embodiments, a resource 150 may be specific to a particular device and may only be utilized by workloads on that device. Some resources 150 may be shared resources which can be accessed and/or utilized by workloads executing on different devices. Resources may be elastic or non-elastic. Elastic resources may be resources which a workload may utilize in a time-sharing fashion or will not hold for its entire life cycle. Examples of elastic resources include CPU cycles and network bandwidth.

Non-elastic resources may include resources which once allocated to a workload cannot be shared or used by other workloads unless the first workload completes or proactively releases the resource. Examples of non-elastic resources include memory, storage device space, swap space, and software licenses.

The resources may be accessed, monitored or utilized via one or more connections such as internal busses or signal lines, or via a communication interface and/or network.

Each processor 101 may be, for example, any type of general-purpose microprocessor or microcontroller, a central or graphics processing unit, a digital signal processing (DSP) processor, an integrated circuit, a field programmable gate array (FPGA), a reconfigurable processor, a programmable read-only memory (PROM), or any combination thereof.

Memory or storage device(s) 1020 may include one or a combination of any type of computer memory that is location either internally or externally (e.g. networked or peripheral) such as, for example, hard drives, flash memory, solid state memory, network storage devices, random-access memory (RAM), cache memory, read-only memory (ROM), Blu-ray® or compact disc read-only memory (CDROM), electro-optical memory, magneto-optical memory, erasable programmable read-only memory (EPROM), and electrically-erasable programmable read-only memory (EEPROM), Ferroelectric RAM (FRAM), non-transitory computer readable media or the like. The memory(ies) and storage provided by these devices may be resource(s) managed by the system 10.

In some examples, memory device(s) 1020 may include data or instruction sets for implemented, controlling or instructing DRM component(s), workloads and/or resources. The memory device(s) 1020 may also include instructions or code for configuring one or more processor(s) and other components of the device 200 or system 10 to perform any of the methods and functions described herein.

Some input/output (I/O) interface(s) 1030 can enable a device 200 or system 10 to interconnect with one or more input devices, such as a keyboard, mouse, camera, touch screen and a microphone, or with one or more output devices such as a display screen and a speaker. In some embodiments, I/O interface(s) 1030 can also include network interfaces which enable devices 200 or aspects of the system 10 to communicate with other components (such as other devices, DRM components or resources), to exchange data with other components, to access and connect to network resources, to serve applications, and perform other computing applications by connecting to one or more wired or wireless networks capable of carrying data including the Internet, Ethernet, plain old telephone service (POTS) line, public switched telephone network (PSTN), integrated services digital network (ISDN), digital subscriber line (DSL), coaxial cable, fiber optics, satellite, mobile, wireless (e.g. Wi-Fi, WiMAX), SS7 signaling network, Bluetooth®, near field communication (NFC), fixed line, local area network, wide area network, busses and others, including any combination of these.

In some examples, one or more I/O interfaces 1030 may enable a device 200 or system 10 to communicate, instruct, control, monitor or otherwise interconnect with a resource or another device or system.

In some embodiments, device(s) 200 and/or system(s) 10 may include input or output device(s) such as keyboard, mouse, camera, touch screen, microphone, displays, etc. For example, a computing device or printing device may include a keypad, touchscreen, or other integrated, peripheral or linked input or output device. The input devices may be configured to receive instructions to run workloads or to change DRM settings. The output devices may be configured to display or otherwise output workload results, workload statuses, resource information, etc.

Figure 4:
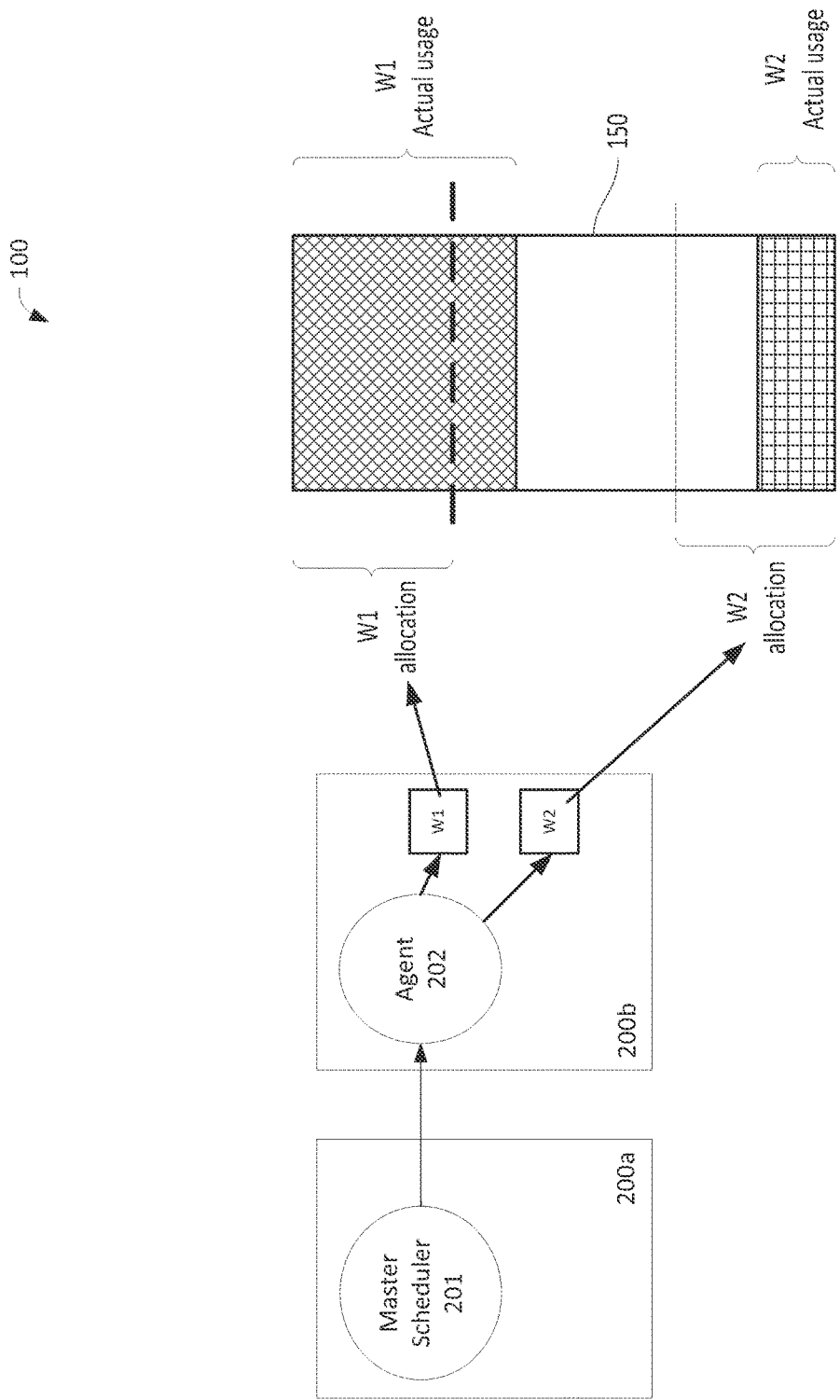
FIG. 4 is a diagram showing aspects of an example system and an example resource map.

FIG. 4 shows aspects of an example system 100 having a DRM master 201 and an agent 202. Two workloads W1, W2 have been submitted to the master 201 which has scheduled and informed the agent 202 to execute the workloads on device 200b. The workloads W1, W2 can be created with an allocation limit for a resource 150. In some examples, this allocation limit may be defined by a user input or application requesting the workload, or may by an administrative setting for the system 100. The resource allocation limit can, in some instances, define a maximum resource usage for a particular workload. These are workload specific and can vary between workloads based on their operating parameters. For example, in FIG. 4, the resource 150 may be a memory resource, and each workload may be assigned a different allocation or usage limit for the memory.

During the runtime of the workloads, the system 100 is configured to monitor the resource usage of the workloads. Generally, an agent 202 will be responsible for monitoring the resources and workloads on its associated device 200b; however, other DRM components or processors on other devices may perform these functions.

In some examples, the DRM system 100 can be configured to leverage underlying operating system mechanisms to create resource container(s), etc. to handle resource enforcement or fencing. Such mechanisms may include, for example, Linux control groups, Workload Manager (WLM) on IBM AIX™ systems, job objects on Windows™, and the like.

With reference to the example in FIG. 4, when a workload's resource usage exceeds its allocation limit, the system 100 can be configured to terminate the workload. In some instances, this may avoid memory crashes or other instability or problems caused by collisions or overuse of a resource.

In FIG. 4, workload W1 has overused its resource allocation so the agent 202 or other DRM component may be configured to terminate the workload W1. In certain applications, it may be difficult to accurately estimate peak resource consumption for a workload so a requestor may intentionally set higher resource limit allocation to avoid termination. However, in many situations, this may lead to resource waste as the workload may never require the requested allocation of resources. In other situations, certain workloads may only have occasional spikes in resources requirements and reserving resources to accommodate these spikes may cause resource waste during the majority of a workload's lifetime.

When a workload is terminated for utilizing resources in excess of its allocation limit, in some situations, the termination may be unnecessary as the system 100 or device 200 may have available resources. For example, in FIG. 4, while W1 is exceeding its resource allocation, the resource 150 does not have a capacity constraint as it has both an unallocated portion and workload W2 is underutilizing its allocation. Accordingly, terminating W1 at this stage may be unnecessary and may waste workload processing.

Figure 5:
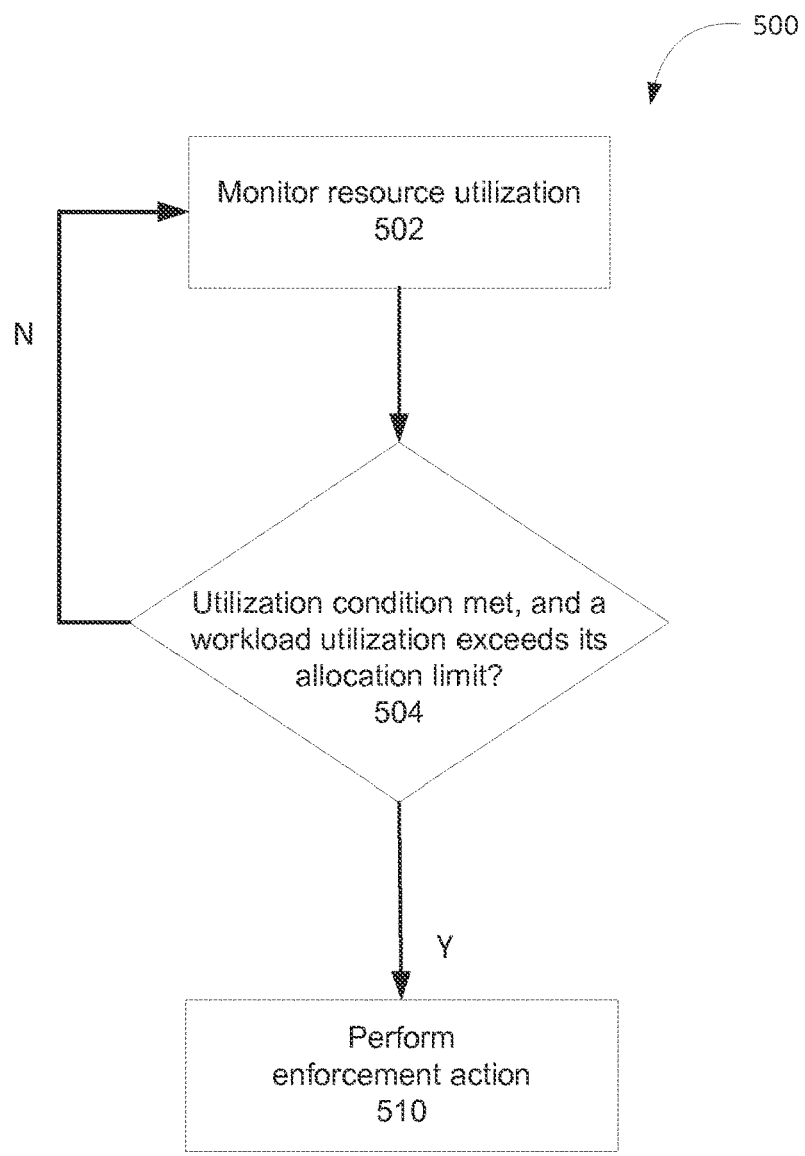
FIGS. 5, 6 and 7 are flowcharts showing aspects of example methods.

FIG. 5 is a flowchart showing aspects of an example method for managing a resource. At 502, one or more processor(s) 101 are configured to monitor utilization of a resource 150. In some embodiments, monitoring resource utilization may include obtaining utilization information including, for example, the total amount of the resource being used, the total percentage of the resource being used, the amount of available resource, and/or a rate at which the resource utilization is changing (e.g. increasing or decreasing).

In some embodiments, a resource may be partitioned or have different allocations. References to resource utilization including utilization rates/percentages, total utilization, and other utilization information may, in some embodiments, refer to the total utilization, utilization rate, etc. of a partition or allocation of one or more resources.

In some embodiments, monitoring resource utilization may include obtaining resource utilization data by each workload using the resource. Workload resource utilization information may include, for example, resource utilization usage, workload resource allocation limits, and/or a rate at which the workload's resource usage is increasing or decreasing.

In some examples, a DRM component (master or agent) may monitor utilization information directly. In some examples, a DRM component may obtain utilization information from another DRM component, device or process.

In some embodiments, the processor(s) may be configured to monitor utilization parameters by periodically or continuously polling the appropriate resource or DRM component in the system. In some embodiments, resource(s) or responsible DRM components of the system may be configured to periodically send the utilization parameters to the processor(s).

In some embodiments, monitoring resource utilization may include using monitored data in one or more calculations. For example, a utilization percentage may be calculated by dividing a total usage amount by a total resource capacity.

In another example, in some embodiments, monitoring resource utilization may include storing past resource utilization data. For example, to obtain a rate at which the resource utilization is increasing, the processor(s) may store and compare past utilization levels with the current or most recent utilization data.

The processor(s) may be configured to store utilization data until the data is updated or for a defined period of time.

The processor(s) may be configured to only monitor or otherwise obtain utilization data which is used to determine whether a utilization condition is met.

In some embodiments, the processor(s) can monitor resource utilization by monitoring a/proc file system (Linux). However, resource utilization information can be obtained and monitored in any suitable manner.

At 504, the processor(s) can be configured to determine whether one or more utilization conditions are met, and if any workload's resource utilization exceeds the workload's resource allocation limit.

In some embodiments, the utilization conditions can be met when utilization of a resource exceeds a defined utilization limit. For example, a utilization limit may include threshold conditions such as a minimum available resource value or a minimum available resource percentage. For example, a utilization condition may be met when a total usage of the resource exceeds a defined maximum utilization threshold, or conversely when an available resource level is less than a defined minimum. For example, a processor may determine that a utilization condition for a 10 GB memory resource is met when 9 GB of the memory have been consumed, and when there is a minimum available resource threshold of greater than 1 GB or a maximum utilization threshold of less than 9 GB.

In another example, a utilization condition may be met when a total usage percentage exceeds a defined maximum threshold, or conversely when an available resource percentage is less than a minimum threshold. For example, in the memory resource example above, a processor may determine that a utilization condition is met if there is an available resource percentage threshold of 11% or a maximum utilization percentage of 89%.

In some embodiments, these utilization conditions may be defined by parameters associated with the resource, agent, DRM system, or any other aspect or combination thereof. In some embodiments, parameters may be set by default, by an administrator or otherwise.

In another example, a utilization condition may be based on a rate at which a resource's total usage is increasing or decreasing (i.e. a consumption rate). For example, a utilization condition may be met when a consumption rate is greater than a defined threshold. In some examples, this condition may be set in recognition that when a resource usage is growing quickly, there is a chance that the resource may be exhausted and therefore, any workload overusing its allocation may cause instability or a crash.

In another example, a utilization condition may be based on a buffer time associated with an amount of time that the system 10 will need to terminate a workload. For example, processor(s) can be configured to determine a resource exhaustion time based on a current resource availability and a current resource consumption rate. The processor(s) can be configured to determine that a utilization condition is met when the resource exhaustion time is less than the buffer time. In some examples, this condition may be set in recognition that since an overusing workload will take a certain amount of time to terminate and free its allocation, if a resource which is being consumed and may be exhausted soon, the system 10 should start a termination or other enforcement action far enough before that time to complete the enforcement action before complete resource exhaustion occurs.

In other examples, other utilization condition factors may be used. In some embodiments, the processor(s) may be configured to determine that a utilization condition is met based on a combination of any number of the factors described herein or others. In some examples, these combinations may be based on logical AND, OR, or NOT operations or relationships between the conditions.

At 504, the processor(s) can also be configured to determine whether a particular workload utilization exceeds its allocation limit. In some examples, this may include comparing a current resource utilization of each workload with its associated resource allocation limit.

If the utilization condition(s) are met, and at least one workload exceeds its allocation limit, at 510, the processor(s) can be configured to perform one or more enforcement actions on one or more of the workloads exceeding their limits.

In some examples, a DRM master, agent or other component may be configured to instruct or to execute an enforcement action.

Enforcement actions include, for example, terminating, suspending, blocking, and/or checkpointing the workload. Terminating a workload can, in some examples, include killing any associated process, freeing any consumed resources and/or informing a scheduler or results manager.

In some examples, the enforcement action may free resources, stop or slow the consumption of a resource, backup the state of a workload which is to be terminated or may be terminated soon, etc.

In some examples, and as described herein with respect to other examples or otherwise, when multiple workloads offend their resource allocations, the processor(s) may be configured to select one or more of the workloads for enforcement based on one or more selection criteria or factors.

If at 504, the utilization condition(s) are not met and/or no workload's utilization exceeds its allocation limit, no enforcement action is taken, and the processor(s) can be configured to continue monitoring resource utilization. In some examples, monitoring can continue after a delay, periodically, continuously, or otherwise.

In some instances, when a utilization condition is not met, a workload whose utilization exceeds its allocation limit may continue to execute without any enforcement action being imposed on it. This may allow resource allocation-offending workloads to continue running when a resource's utilization can accommodate it, as illustrated for example in FIG. 4.

In some instances, this may reduce lost processing or otherwise improve efficiency and/or throughput by not unnecessarily killing and restarting workloads. In some instances, this may more effectively accommodate the peaks and valleys of resource consumption of certain types of workloads. In some instances, this may reduce the pressure to precisely define or ascertain a workload's resource requirements in advance.

Figure 6:
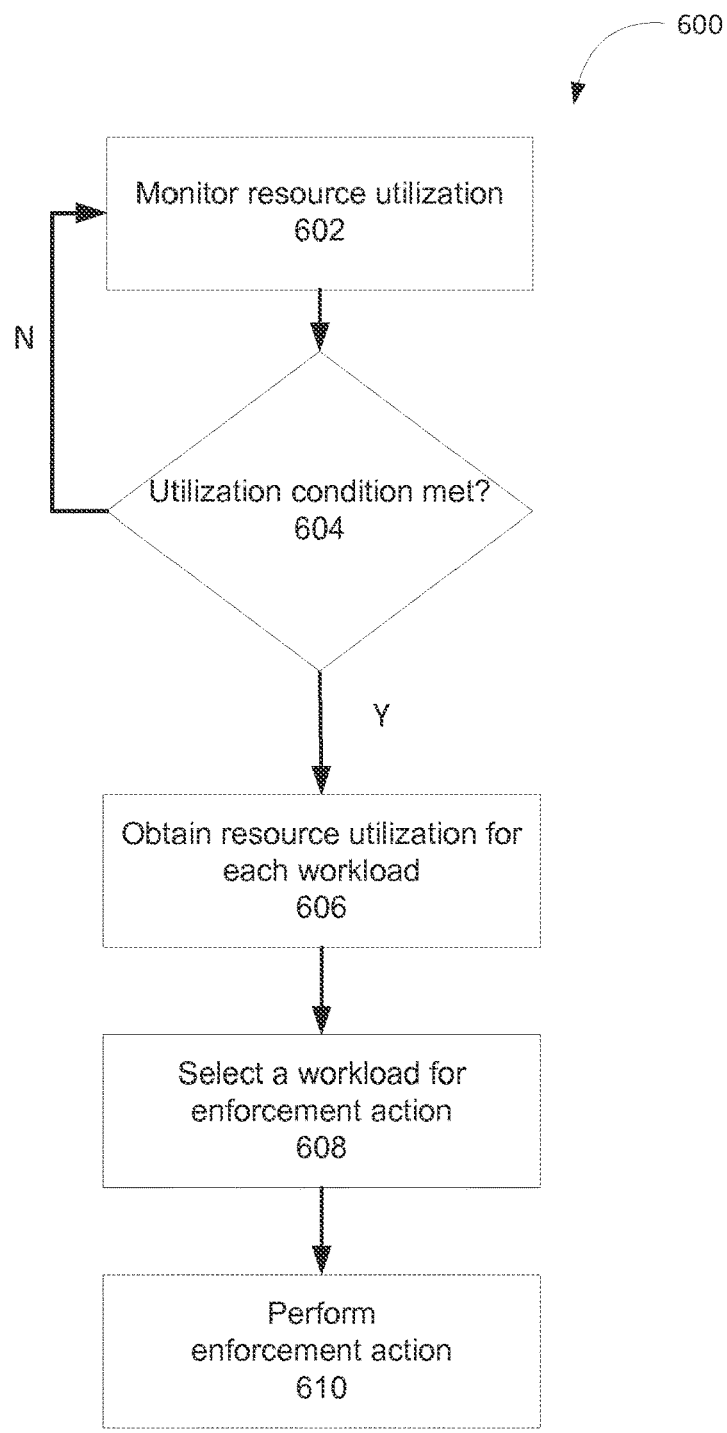

FIG. 6 is a flowchart showing aspects of an example method 600 for managing a resource. Similar to 502 in FIG. 5, at 602, one or more processor(s) 101 are configured to monitor utilization of a resource 150. In some embodiments, monitoring resource utilization may include obtaining utilization information including, for example, the total amount of the resource being used, the total percentage of the resource being used, the amount of available resource, and/or a rate at which the resource utilization is changing (e.g. increasing or decreasing).

At 604, the processor(s) can be configured to determine whether one or more utilization conditions are met. The utilization conditions can be similar to those described above with respect to 504, or otherwise.

If at 604, the utilization condition(s) are not met, no enforcement action is taken, and the processor(s) can be configured to continue monitoring resource utilization. In some examples, monitoring can continue after a delay, periodically, continuously, or otherwise.

In some instances, when a utilization condition is not met, a workload whose utilization exceeds its allocation limit may continue to execute without any enforcement action being imposed on it. This may allow resource allocation-offending workloads to continue running when a resource's utilization can accommodate it, as illustrated for example in FIG. 4.

In some instances, this may reduce lost processing or otherwise improve efficiency and/or throughput by not unnecessarily killing and restarting workloads. In some instances, this may more effectively accommodate the peaks and valleys of resource consumption of certain types of workloads. In some instances, this may reduce the pressure to precisely define or ascertain a workload's resource requirements.

Moreover in some instance, in the example method 600, the processor(s) may be configured such that they do not monitor the utilization of individual workload(s) until a utilization condition is met. In some examples, this may increase the efficiency of the system 10 by reducing the processing and memory accesses which may be required to monitor workload utilizations.

If at 604 the monitoring conditions are met, at 606, the processor(s) can be configured to obtain resource utilization information for each workload. In some examples, a DRM master or agent may be configured to determine or obtain each workload's resource utilization. In some examples, a DRM master may instruct a DRM agent to obtain workload resource utilization(s). In some embodiments, the processor(s) can monitor resource utilization by monitoring a/proc file system (Linux). However, resource utilization information can be obtained and monitored in any suitable manner.

If no workload exceeds its resource allocation limit, the process can return to monitoring the resource utilization 602 or obtaining workload utilizations 606.

If a single workload exceeds its resource allocation limit, the processor(s) can be configured, at 610, to perform an enforcement action as described herein or otherwise.

It multiple workloads have resource utilizations exceeding their respective resource allocation limits, in some embodiments, at 608, the processor(s) can be configured to select one or more of the workloads on which to perform enforcement action(s).

In some embodiments, the processor(s) may be configured to rank or otherwise compare the workloads having resource utilization over their allocation limits based on at least one selection criterion.

One example selection criterion is a resource overuse ratio which can represent a ratio of the amount of resource overuse by the workload to the workload's allocation limit.

In some examples, this can be calculated by (usage−limit)/limit. For example, if workload A has a memory allocation limit of 10 GB and consumes 15 GB, workload A's overuse ratio is 0.5. If workload B has a memory allocation limit of 20 GB and consumes 28 GB, workload B's resource overuse ratio is 0.4. In some examples, workload(s) having the highest overuse ratios (in this case workload A) will be ranked more highly for enforcement action.

Another example selection criterion is a resource's absolute overuse which can, in some examples, be determined by (usage−limit). In the example above, workload A has an overuse value of 5 GB while workload B has an overuse value of 8 GB. In some examples, workload(s) having the highest absolute overuse value (in this case workload B) will be ranked more highly for enforcement action.

Another example selection criterion is a workload priority. Higher priority workloads may be considered last for enforcement action when lower priority workloads are running.

Another example selection criterion is fairness. In some examples, the system 10 may consider fairness across tenants (e.g. users, users groups, projects, business units, etc.). For example, if a tenant already has workload(s) being selected for enforcement action, the system may be configured to consider other tenant's workloads first. Fairness across tenants can be local (e.g. to a particular resource) or global (e.g. taking all resources in the system into account).

Another example selection criterion is a resource consumption rate which can be defined by the amount of resource consumed by a workload over a time period. Workloads having higher resource consumption rates can, in some instances, have a larger impact on resources shortages even if it may have a lower absolute overusage. For example, if workload A consumes memory at 500 MB/s, and workload B consumes memory at 5 MB/s workload A would be considered first for enforcement action as it may be more likely to cause a system to crash.

Another example selection criterion may be an age of the workload. If a workload has been operating for a longer period of time, it may be more detrimental to terminate such a workload as it may be expensive to have to restart and re-run the workload for that period of time. Therefore, in some examples, older workloads may be ranked lower than younger workloads for enforcement action.

In some embodiments, the processor(s) can be configured to consider a single criterion, or a combination of any number of criteria having any suitable weighting. In some examples, the processor(s) can be configured to rank or generate a metric based on the criterion/criteria and their relative weightings.

In some embodiments, the processor(s) can be configured to consider selection criteria for a number of different resources when selecting workload(s) for enforcement action.

In some embodiments, the processor(s) can be configured to select a single workload or multiple workloads for enforcement action. In some examples, the number of selected workloads may depend on the resource utilization and/or the amount of resource that should be freed so that the utilization conditions are no longer met.

Figure 7:
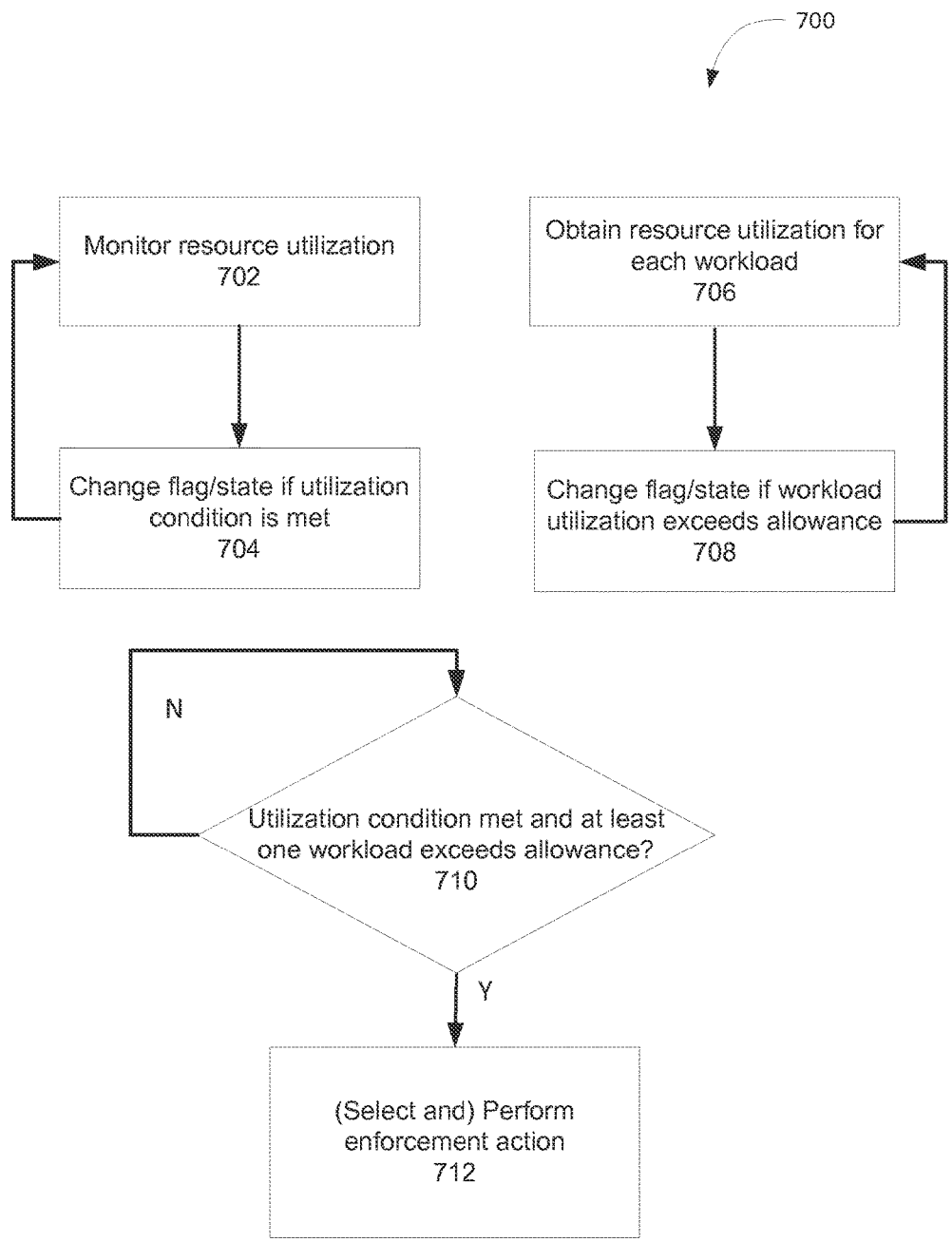

At 610, the processor(s) can be configured to perform enforcement action(s) on the selected workloads As illustrated by the example method 700 in FIG. 7, in some embodiments, the monitoring of the resources may be conducted separately from the workload selection and enforcement actions.

At 702, the processor(s) can be configured to monitor resource utilization as described herein or otherwise. Based on the monitoring, if a utilization condition is met, the processor(s) at 704 can be configured to set a utilization-condition-met flag or move into a utilization-condition-met state; or if a utilization condition is not met, the processor(s) can be configured to clear the utilization-condition-met flag or move to a utilization-condition-not-met state.

Similarly, at 706, the processor(s) can be configured to obtain resource utilization information for each workload using a resource. If a workload exceeds its resource allocation limit, the processor(s) at 708 can be configured to set a workload overutilization flag or change into a workload overutilization state; of if no workload exceeds its resource allocation limit, the processor(s) can be configured to clear a workload overutilization flag or change to a no-overutilizing-workload state.

While flags and states are described in these examples, any other suitable mechanisms, interrupts, etc. can be used.

At 710, the processor(s) can monitor the flags/states, etc. to determine if both a utilization condition has been met, and if at least one workload has exceeded its resource allocation limit.

At 712, the processor(s) can, if applicable, select one or more of the offending workloads as described herein or otherwise, and can perform one or more enforcement actions.

Referring again to the example scenario in FIG. 4, if the system 100 has a utilization condition which is only met when there is less than 5% of the resource 150 remaining, and the unallocated portion of the resource plus the unused portion of W2's allocation is greater than 5%, then W1 may be allowed to continue running despite its resource overusage.

If the unallocation portion of the resource plus the unused portion of W2 were to decrease such that the less than 5% of the resource 150 was available, the system, applying one or more of the methods described or suggested herein, may perform an enforcement action on workload W1 to maintain stability of the system.

Figure 8:
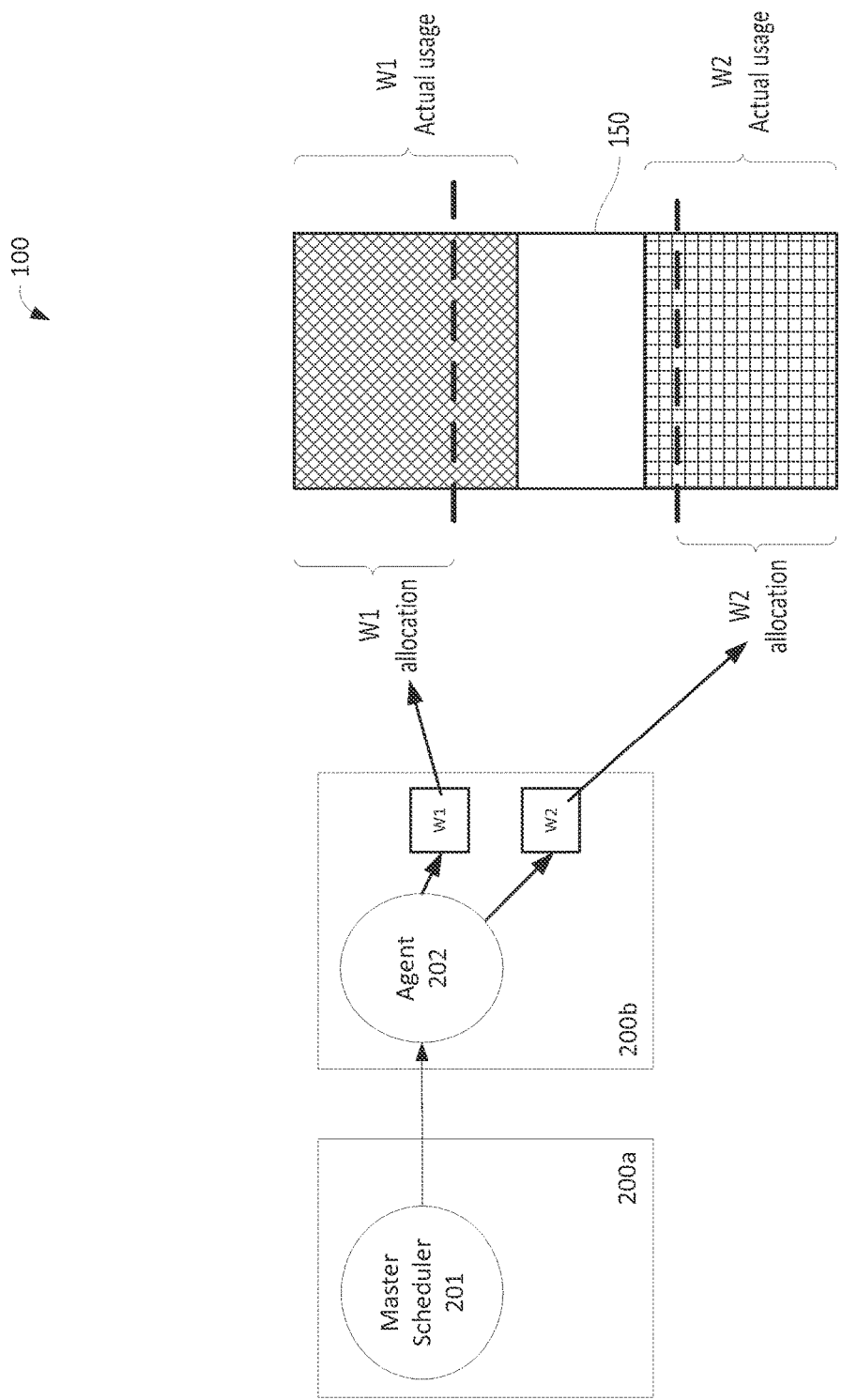
FIG. 8 is a diagram showing aspects of an example system and an example resource map.

In another example scenario, in FIG. 8, both workloads W1 and W2 have exceeded their resource allocation limits. Assuming a utilization condition has been met, instead of terminating both workloads, the system 100, applying one or more of the methods described or suggested herein, may perform an enforcement action only on one of the workloads based on one or more selection criteria. This may allow the other workload to continue running while maintaining the stability of the system.

Embodiments disclosed herein may be implemented by using hardware only or software or some combination thereof. Based on such understandings, the technical solution may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computing device (computer, server, mainframe, or network device) to execute the methods provided in the embodiments.

Program code may be applied to input data to perform the functions described herein and to generate output information. The output information is applied to one or more output devices. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and combination thereof.

Each computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Numerous references may be made regarding servers, services, interfaces, portals, platforms, or other systems formed from hardware devices. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

Various example embodiments are described herein. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of managing resources of a computing system, the method comprising:
    monitoring, at a distributed resource management system, a total utilization of a non-elastic resource of the resources of the computing system being used by a plurality of workloads during runtime of the plurality of workloads, wherein monitoring includes obtaining a current utilization of the non-elastic resource by each workload and a resource allocation limit for the non-elastic resource for each workload, each workload associated with one of a plurality of tenants;
    determining, at a distributed resource management system, whether a utilization condition is met based on the total utilization of the non-elastic resource;
    after determining that both the utilization condition is met, and the current utilization of the non-elastic resource by at least two workloads of the plurality of workloads exceeds its respective resource allocation limit for the non-elastic resource, selecting, at the distributed resource management system, at least one of the at least two workloads on which to perform an enforcement action based on at least one selection criteria; and
    performing, at the distributed resource management system, the enforcement action on each selected workload, the enforcement action comprising one of terminating, suspending, or checkpointing each selected workload;
    wherein selecting the at least one of the at least two workloads based on the at one selection criteria comprises:
    selecting a workload of the least two workloads having a greatest resource overuse ratio or exceeds its resource allocation limit by a greatest amount:
    or
    selecting a workload of the least two workloads having a lowest priority level when each of the at least two workloads has a priority level;
    or
    selecting a workload of the least two workloads associated with a tenant having a greater total utilization of the resources of the computing system when each of the at least two workloads is associated with a different one of the plurality of tenants.

2. The method of claim 1, wherein determining whether the utilization condition is met comprises determining whether the utilization of the non-elastic resource exceeds a defined utilization limit.

3. The method of claim 1, wherein when determining that the utilization condition is not met, no enforcement action is performed on a workload having the current utilization of the non-elastic resource exceeding its associated resource allocation limit for the non-elastic resource.

4. The method of claim 1, wherein when each of the at least two workloads have the same priority level, selecting the at least one of the at least two workloads based on the at one selection criteria comprises selecting the workload of the least two workloads having the greatest resource overuse ratio or exceeds its resource allocation limit by the greatest amount.

5. The method of claim 1, wherein selecting the at least one of the at least two workloads based on the at one selection criteria further comprises selecting a workload of the least two workloads a rate at which the utilization of the resource by each of the at least two workloads is increasing.

6. The method of claim 1, comprising obtaining a resource overutilization time for the non-elastic resource based on a rate at which the level of the non-elastic resource by the plurality of workloads is increasing or decreasing; and
    wherein the utilization condition is met when the rate is greater than a defined threshold.

7. The method of claim 6 comprising obtaining a current availability for the non-elastic resource, determining a resource exhaustion time for the non-elastic resource based on the rate and the current resource availability, and wherein determining whether the utilization condition is met comprising determining whether the resource exhaustion time is less than a defined buffer time, and wherein the defined buffer time is based on an amount of time required to perform the enforcement action and release the associated utilized resource.

8. The method of claim 1, wherein the non-elastic resource is one of: a memory resource, a disk space resource, a swap resource, and a software license resource.

9. The method of claim 1, wherein the non-elastic resource being monitored for the total utilization is of a first type; the at least two workloads use other resources of a second type different from the first type; and selecting at least one of the at least two workloads on which to perform the enforcement action is based at least in part on the other resources being used by the at least two workloads.

10. The method of claim 1, wherein selecting the at least one of the at least two workloads based on the at one selection criteria further comprises selecting a workload of the least two workloads based on an age of each of the at least two workloads.

11. A system comprising:
at least one processor for managing a resources of the system, the at least one processor configured for:
monitoring a total utilization of a non-elastic resource of the resources of the system being used by a plurality of workloads during runtime of the plurality of workloads, wherein monitoring includes obtaining a current utilization of the non-elastic resource by each workload and a resource allocation limit for the non-elastic resource for each workload, each workload associated with one of a plurality of tenants;
determining whether a utilization condition is met based on the total utilization of the non-elastic resource;
after determining that both the utilization condition is met, and the current utilization of the non-elastic resource by at least two workloads of the plurality of workloads exceeds its respective resource allocation limit for the non-elastic resource, selecting at least one of the at least two workloads on which to perform an enforcement action based on at least one selection criteria; and
performing the enforcement action on each selected workload, the enforcement action comprising one of terminating, suspending, or checkpointing each selected workload;
wherein selecting the at least one of the at least two workloads based on the at one selection criteria comprises:
selecting a workload of the least two workloads having a greatest resource overuse ratio or exceeds its resource allocation limit by a greatest amount;
or
selecting the at least one of the at least two workloads based on the at one selection criteria comprises selecting a workload of the least two workloads having a lowest priority level when each of the at least two workloads has a priority level;
or
selecting a workload of the least two workloads associated with the tenant having a greater total utilization of the resources of the computing system when each of the at least two workloads is associated with a different one of the plurality of tenants.

12. The system of claim 11, wherein the at least one processor is configured such that when determining that the utilization condition is not met, no enforcement action is performed on a workload having a current utilization of the non-elastic resource exceeding its associated resource allocation limit for the non-elastic resource.

13. The system of claim 11, wherein determining whether the utilization condition is met comprises determining whether the utilization of the non-elastic resource exceeds a defined utilization limit.

14. The system of claim 11, wherein selecting the at least one of the at least two workloads is based on at least one of: resource overuse ratios, amounts by which workload utilizations exceed their allocation limits, priority values, tenants, rates at which utilization levels of each of the workloads are increasing, and ages of the more than one workload.

15. The system of claim 11 wherein when each of the at least two workloads have the same priority level, selecting the at least one of the at least two workloads based on the at one selection criteria further comprises selecting the workload of the least two workloads having the greatest resource overuse ratio or exceeds its resource allocation limit by the greatest amount.

16. The system of claim 11, comprising obtaining a resource overutilization time for the non-elastic resource based on a rate at which the utilization of the non-elastic resource by the plurality of workloads is increasing or decreasing; and
wherein the utilization condition is met when the rate is greater than a defined threshold.

17. The system of claim 11 wherein the non-elastic resource is one of: a memory resource, a disk space resource, a swap resource, and a software license resource.

18. The system of claim 11, wherein the non-elastic resource being monitored for the total utilization is of a first type; the at least two workloads use other resources of a second type different from the first type; and selecting at least one of the at least two workloads on which to perform the enforcement action is based at least in part on the other resources being used by the at least two workloads.

19. The system of claim 11, wherein selecting the at least one of the at least two workloads based on the at one selection criteria further comprises selecting a workload of the least two workloads based on an age of each of the at least two workloads.

20. A non-transitory, computer-readable medium or media having stored thereon computer-readable instructions which when executed by at least one processor cause the at least one processor to:
monitor, at a distributed resource management system, a total utilization of a non-elastic resource of the resources of the computing system being used by a plurality of workloads during runtime of the plurality of workloads, wherein monitoring includes obtaining a current utilization of the non-elastic resource by each workload and a resource allocation limit for the non-elastic resource for each workload, each workload associated with one of a plurality of tenants;
determining, at a distributed resource management system, whether a utilization condition is met based on the total utilization of the resource;
after determining that both the utilization condition is met, and the current utilization of the non-elastic resource by at least two workloads of the plurality of workloads exceeds its respective resource allocation limit for the non-elastic resource, selecting, at the distributed resource management system, at least one of the at least two workloads on which to perform an enforcement action based on at least one selection criteria; and
performing, at the distributed resource management system, the enforcement action on each selected workload, the enforcement action comprising one of terminating, suspending, or checkpointing each selected workload;
wherein selecting the at least one of the at least two workloads based on the at one selection criteria comprises:
selecting a workload of the least two workloads having a greatest resource overuse ratio or exceeds its resource allocation limit by a greatest amount;

or selecting a workload of the least two workloads having a lowest priority level when each of the at least two workloads has a priority level;

or selecting a workload of the least two workloads associated with the tenant having a greater total utilization of the resources of the computing system when each of the at least two workloads is associated with a different one of the plurality of tenants.

* * * * *